(12) United States Patent
Sokolov et al.

(10) Patent No.: US 10,419,375 B1
(45) Date of Patent: Sep. 17, 2019

(54) SYSTEMS AND METHODS FOR ANALYZING EMOTIONAL RESPONSES TO ONLINE INTERACTIONS

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 164 days.

(21) Appl. No.: 15/181,457

(22) Filed: Jun. 14, 2016

(51) Int. Cl.
G06F 15/16 (2006.01)
H04L 12/58 (2006.01)
G10L 25/63 (2013.01)
H04L 29/08 (2006.01)

(52) U.S. Cl.
CPC .............. H04L 51/12 (2013.01); G10L 25/63 (2013.01); H04L 51/32 (2013.01); H04L 67/22 (2013.01)

(58) Field of Classification Search
CPC ... H04L 67/12; H04L 67/125; H04L 12/2816; H04L 12/2823; H04L 12/2803; H04L 12/282; H04L 12/2829; H04L 2012/2841; H04L 2012/2845; H04L 2012/2849; H04L 2012/285
USPC ................................................ 709/204, 206
See application file for complete search history.

(56) References Cited

U.S. PATENT DOCUMENTS

| 6,212,558 | B1 | 4/2001 | Antur et al. |
| 7,027,621 | B1 | 4/2006 | Prokoski |
| 8,473,752 | B2 | 6/2013 | Locker et al. |
| 8,677,505 | B2 | 3/2014 | Redlich et al. |
| 8,898,777 | B1 | 11/2014 | Oliver |
| 9,147,054 | B1 | 9/2015 | Beal et al. |
| 9,680,852 | B1 | 6/2017 | Wager et al. |
| 9,769,118 | B2 | 9/2017 | Joe et al. |
| 9,838,429 | B1 | 12/2017 | Cheung et al. |
| 2003/0023444 | A1 | 1/2003 | St. John |
| 2003/0156304 | A1 | 8/2003 | Fedorovskaya et al. |
| 2006/0036153 | A1 | 2/2006 | Laken |
| 2006/0282493 | A1* | 12/2006 | Iwamura ............... G06Q 90/00 709/200 |
| 2008/0301779 | A1 | 12/2008 | Garg et al. |
| 2010/0205541 | A1 | 8/2010 | Rapaport et al. |
| 2012/0011561 | A1 | 1/2012 | Courtney et al. |

(Continued)

OTHER PUBLICATIONS

Norton Family, https://family.norton.com/web/, as accessed Mar. 22, 2016, Symantec Corporation, (on or before Mar. 22, 2016).

(Continued)

*Primary Examiner* — Farzana B Huq
(74) *Attorney, Agent, or Firm* — FisherBroyles, LLP

(57) ABSTRACT

The disclosed computer-implemented method for analyzing emotional responses to online interactions may include (1) identifying an online interaction of a user, (2) detecting an emotional response of the user to the online interaction by monitoring one or more emotional indicators of the user during the online interaction and determining, based on an evaluation of the one or more emotional indicators, that the emotional response of the user is outside an expected range, and (3) performing a security action in response to determining that the user's emotional response is outside the expected range. Various other methods, systems, and computer-readable media are also disclosed.

20 Claims, 6 Drawing Sheets

(56) References Cited

U.S. PATENT DOCUMENTS

| | | |
|---|---|---|
| 2014/0026201 A1 | 1/2014 | Srinivasan et al. |
| 2014/0047512 A1* | 2/2014 | Sidi .................. G06F 21/31 |
| | | 726/4 |
| 2014/0221866 A1* | 8/2014 | Quy .................. H04W 4/21 |
| | | 600/544 |
| 2014/0280577 A1* | 9/2014 | Beechuk ............ H04W 4/21 |
| | | 709/204 |
| 2014/0344718 A1 | 11/2014 | Rapaport et al. |
| 2014/0358891 A1* | 12/2014 | Anstandig .......... G06Q 30/0201 |
| | | 707/710 |
| 2015/0170638 A1 | 6/2015 | Bezar |
| 2015/0206000 A1* | 7/2015 | el Kaliouby ....... G06K 9/00315 |
| | | 382/118 |
| 2015/0213002 A1* | 7/2015 | Gou .................. G06F 17/2785 |
| | | 704/9 |
| 2015/0313530 A1* | 11/2015 | Kodra ................ G16H 50/70 |
| | | 382/170 |
| 2015/0332603 A1 | 11/2015 | Aravkin et al. |
| 2016/0004862 A1 | 1/2016 | Almehmadi et al. |
| 2016/0021083 A1 | 1/2016 | Wyn-Harris |
| 2016/0072903 A1* | 3/2016 | Chakra ............... G06F 17/2785 |
| | | 704/9 |
| 2016/0353278 A1 | 12/2016 | Paschel et al. |
| 2017/0293763 A1 | 10/2017 | Shear et al. |

OTHER PUBLICATIONS

Apple Watch, http://www.apple.com/watch/, as accessed Mar. 22, 2016, Apple Inc., (Jan. 29, 2013).

Norton Internet Security, https://us.norton.com/internet-security, as accessed Mar. 22, 2016, Symantec Corporation, (Sep. 18, 2010).

Javier G. Razuri et al., Automatic emotion recognition through facial expression analysis in merged images based on an Artificial Neural Network, http://ieeexplore.ieee.org/document/6714652/, 2013 12th Mexican International Conference on Artificial Intelligence, IEEE, (Nov. 24-30, 2013).

Symantec RuleSpace, https://www.symantec.com/products/threat-protection/rulespace, as accessed Mar. 22, 2016, Symantec Corporation, (Mar. 18, 2016).

John Pugh, Watch Monitors Stress Levels, http://www.psfk.com/2012/10/watch-relieves-stress.html, PSFK LLC, (Oct. 28, 2012).

Kelly Hodgkins, Apple Researching Automatic Mood Assessment for Targeted Ad Delivery, http://www.macrumors.com/2014/01/23/mood-based-ad-delivery/, MacRumors.com, LLC, (Jan. 23, 2014).

Microexpression, https://en.wikipedia.org/wiki/Microexpression, as accessed Mar. 22, 2016, Wikipedia, (Jan. 27, 2005).

Trauma trigger, https://en.wikipedia.org/wiki/Trauma_trigger, as accessed Mar. 22, 2016, Wikipedia, (Sep. 14, 2008).

Lie detection, https://en.m.wikipedia.org/wiki/Lie_detection, as accessed Mar. 22, 2016, Wikipedia, (Jun. 26, 2013).

Lukasz Grabiec, Lie Detector Machine, https://gearapp.devpost.com/submissions/24795-lie-detector-machine, Devpost, (on or before Jul. 13, 2014).

Ilya Sokolov, et al; Systems and Methods for Evaluating Security-Policy Modification Requests; U.S. Appl. No. 15/157,431, filed May 18, 2016.

Ilya Sokolov, et al; Systems and Methods for Classifying Online Content Based on Human Reaction; U.S. Appl. No. 15/157,432, filed May 18, 2016.

Rolfe Winkler et al., Apple Buys Artificial-Intelligence Startup Emotient, http://www.wsj.com/articles/apple-buys-artificial-intelligence-startup-emotient-1452188715, The Wall Street Journal, (Jan. 7, 2016).

Bark; https://www.bark.us/how; on or before Apr. 26, 2017.

Ilya Sokolov et al.; Systems and Methods of Administering Computer Activities Based Upon Emotional Intelligence; U.S. Appl. No. 15/227,217, filed Aug. 3, 2016.

* cited by examiner

ND METHODS FOR ANALYZING
SYSTEMS AND METHODS FOR ANALYZING EMOTIONAL RESPONSES TO ONLINE INTERACTIONS

BACKGROUND

There has long been a need to create safe and professional online environments that are sheltered from the open and unmanaged environment of the Internet. At home and at work, parents and employers need to shield users, particularly children, from threats, profanity, cyberbullying, sexual harassment, inappropriate content, and disturbing interactions.

Traditional content control applications may recognize and filter the most blatant examples of pornography, hate speech, threats, or other offensive content. However, bullying, harassment, threats, and other disturbing interactions may involve sarcasm or innuendo that is beyond the capabilities of content analysis and filtering systems to detect and control. In other instances, users may feel threatened by innocuous online interactions that involve someone who has acted belligerently at other times or in other contexts. Even interactions with friends, family members, or other loved ones may be stress-inducing at times, particularly for adolescents. Accordingly, the instant disclosure identifies and addresses a need for additional and improved systems and methods for analyzing emotional responses to online interactions.

SUMMARY

As will be described in greater detail below, the instant disclosure describes various systems and methods for analyzing emotional responses to online interactions of a user. By identifying a user's online interactions and analyzing a user's emotional response to the online interactions, the disclosed systems and methods may determine when the user experiences a strong or unexpected emotional response to the online interactions. By monitoring one or more emotional indicators for the user, the disclosed systems and methods may determine that the emotional response is outside an expected range and that a security action should be initiated.

In one example, a computer-implemented method for analyzing emotional responses to online interactions may include (1) identifying an online interaction of a user, (2) detecting an emotional response of the user to the online interaction by monitoring one or more emotional indicators of the user during the online interaction and determining, based on an evaluation of the one or more emotional indicators, that the emotional response of the user is outside an expected range, and (3) performing a security action in response to determining that the user's emotional response is outside the expected range.

In some examples, determining that the user's emotional response is outside the expected range may include identifying previous measurements for the one or more emotional indicators of the user to determine the expected range of the one or more emotional indicators for the user and determining that the emotional response of the user is outside the expected range for the user. In some examples, the computer-implemented method may further include analyzing measurements of the one or more emotional indicators for a group of users to establish the expected range.

In one embodiment, (1) monitoring the one or more emotional indicators of the user during the online interaction may include accumulating, for a group of users, emotional indicator measurements pertaining to the online interaction, (2) determining, based on an evaluation of the one or more emotional indicators, that the emotional response of the user is outside the expected range includes determining, based on an evaluation of the emotional indicator measurements, that for at least a subset of the users the online interaction elicits emotional responses outside the expected range, and (3) the security action is performed in response to the determination that the online interaction elicits emotional responses outside the expected range for at least the subset of users. In one embodiment, the computer-implemented method may further include (1) accumulating, for a group of users, emotional indicator measurements pertaining to the online interaction, (2) determining, based on an evaluation of the emotional indicator measurements, that the online interaction elicits emotional responses outside the expected range for the user and within the expected range for a subset of the users, and (3) perform the security action in response to the determination that the online interaction elicits emotional responses outside the expected range for the user and within the expected range for the subset of users.

In one embodiment, (1) the computer-implemented method may further include (a) identifying a group of online interactions between the user and a second user, (b) monitoring one or more emotional indicators of the user during the online interactions, and (c) evaluating the emotional indicators to assign a category to an emotional relationship between the user and the second user, and (2) the security action is performed, based on the category assigned to the emotional relationship between the user and the second user.

In one embodiment, the online interaction may include an email message, a text message, social network content, an audio message, and/or a video message. In one embodiment, the security action may include blocking a message from a sender, blocking a message from a social network, reporting the online interaction to an administrator of the online service, reporting the online interaction to a parent of the user, reporting the online interaction to an account administrator for the user, and/or monitoring additional emotional indicators for the user.

In one embodiment, a system for implementing the above-described method may include several modules stored in memory, such as (1) an identification module that identifies an online interaction of a user, (2) an analysis module that detects an emotional response of the user to the online interaction by monitoring one or more emotional indicators of the user during the online interaction and determining, based on an evaluation of the one or more emotional indicators, that the emotional response of the user is outside an expected range, and (3) a security module that performs a security action in response to determining that the user's emotional response is outside the expected range. The system may also include at least one physical processor configured to execute the identification module, the analysis module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an online interaction of a user, (2) detect an emotional response of the user to the online interaction by monitoring one or more emotional indicators of the user during the online interaction and determining, based on an evaluation of the one or more emotional indicators, that the emotional response of the user is outside an expected range, and (3) perform a security action in response to determining that the user's emotional response is outside the expected range.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of illustrative embodiments and are a part of the specification. Together with the following description, these drawings demonstrate and explain various principles of the instant disclosure.

Figure 1:
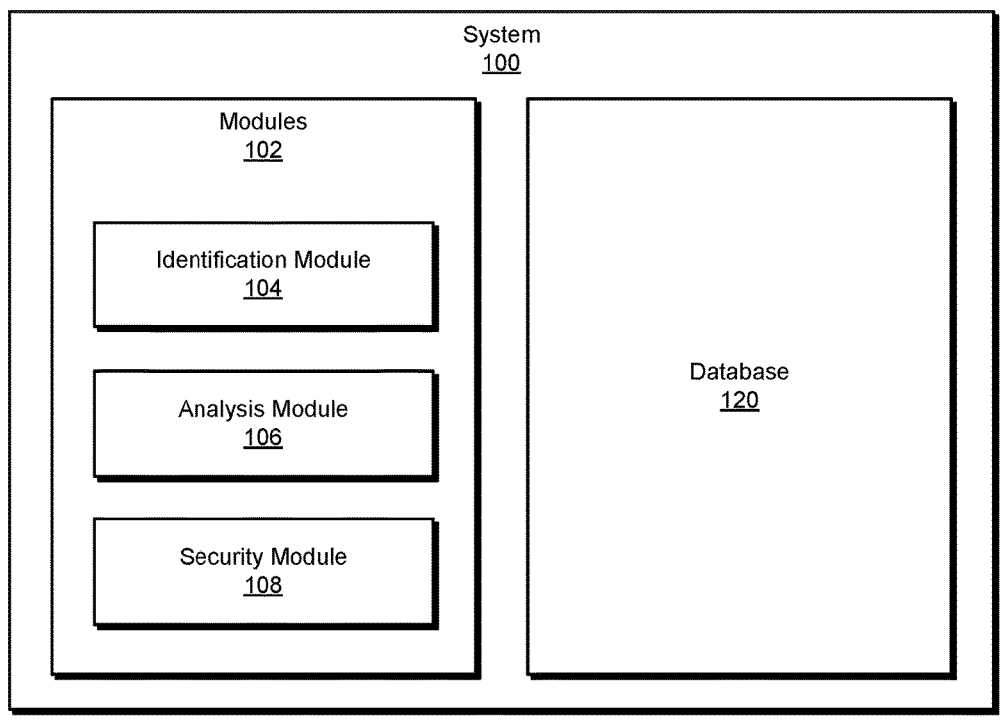
FIG. 1 is a block diagram of an illustrative system for analyzing emotional responses to online interactions.

Throughout the drawings, identical reference characters and descriptions indicate similar, but not necessarily identical, elements. While the illustrative embodiments described herein are susceptible to various modifications and alternative forms, specific embodiments have been shown by way of example in the drawings and will be described in detail herein. However, the illustrative embodiments described herein are not intended to be limited to the particular forms disclosed. Rather, the instant disclosure covers all modifications, equivalents, and alternatives falling within the scope of the appended claims.

DETAILED DESCRIPTION OF ILLUSTRATIVE EMBODIMENTS

The present disclosure is generally directed to systems and methods for analyzing emotional responses to online interactions. As will be explained in greater detail below, by analyzing emotional indicators associated with online interactions, the disclosed systems and methods may determine when an online interaction has elicited a strong or unexpected emotional response and initiate a security action. By identifying unexpected emotional responses associated with online interactions, the systems and methods described herein may help create safe online environments by protecting users from threats, cyberbullying, sexual harassment, and other offensive interactions.

Figure 2:
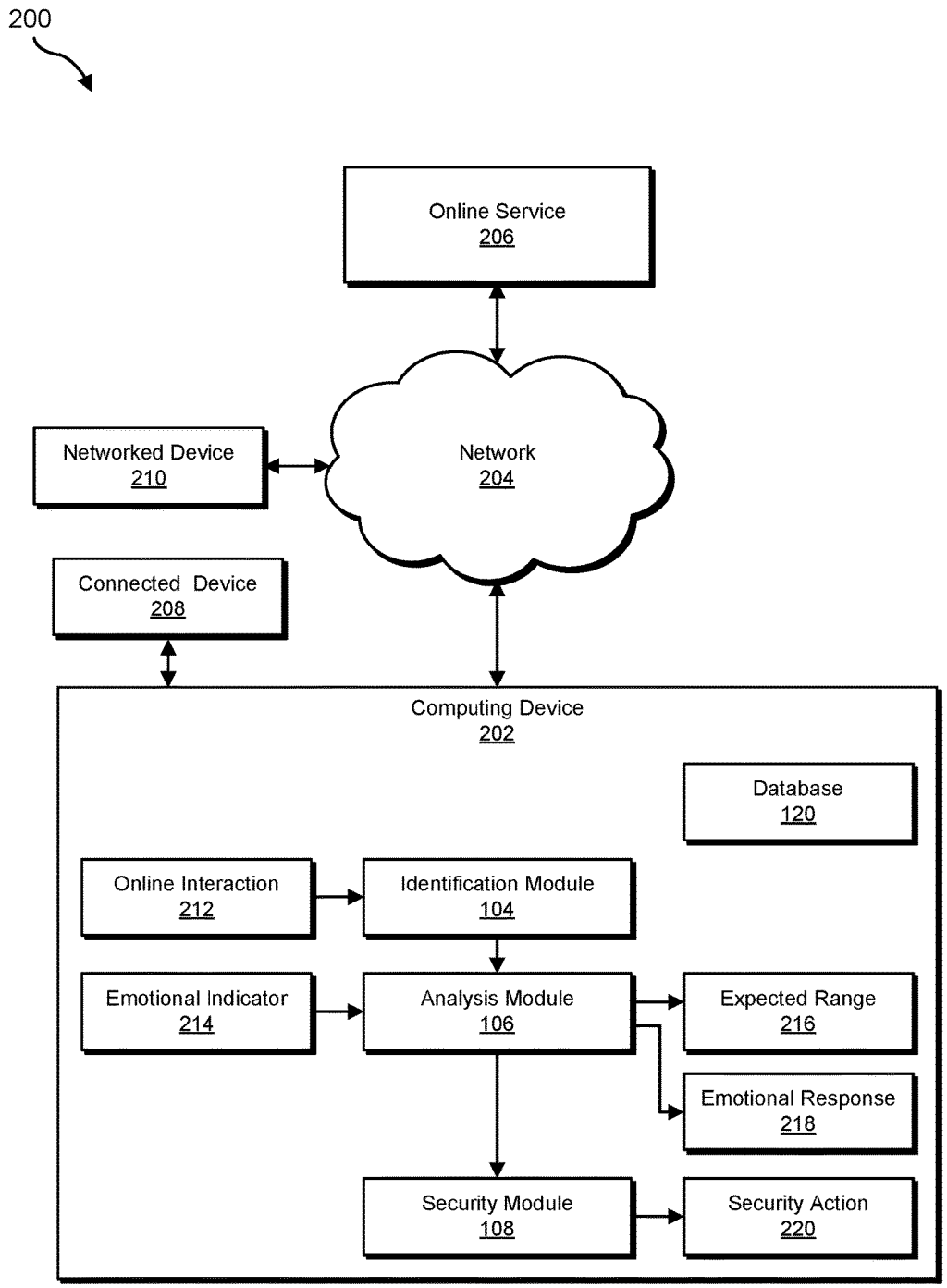
FIG. 2 is a block diagram of an additional illustrative system for analyzing emotional responses to online interactions.
Figure 3:
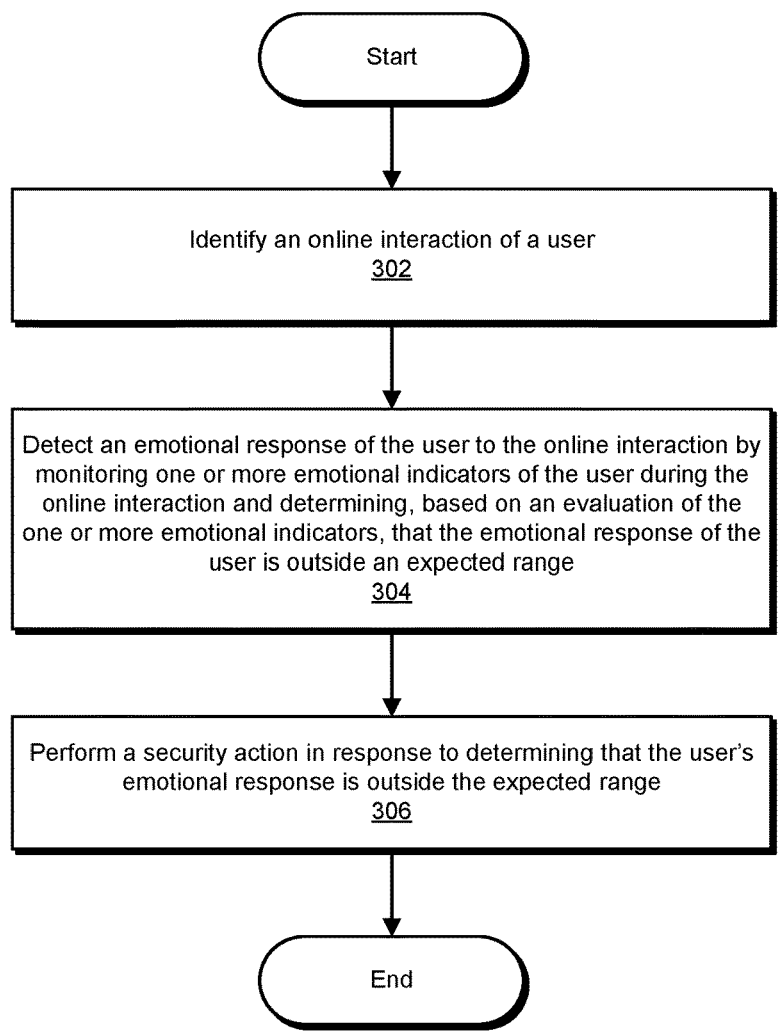
FIG. 3 is a flow diagram of an illustrative method for analyzing emotional responses to online interactions.
Figure 4:
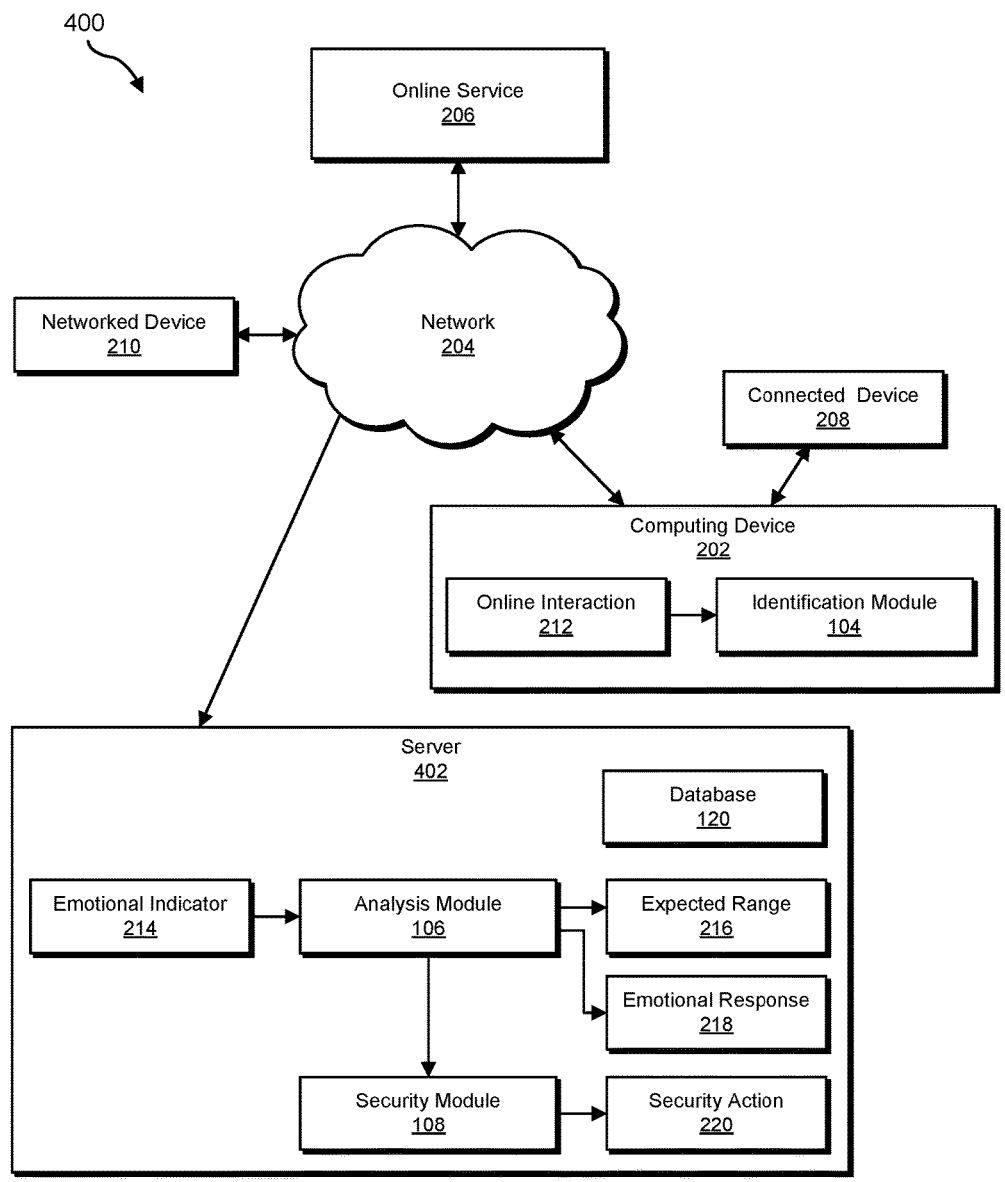
FIG. 4 is a block diagram of an illustrative computing system for analyzing emotional responses to online interactions.

The following will provide, with reference to FIGS. 1, 2 and 4, detailed descriptions of illustrative systems for analyzing emotional responses to online interactions. Detailed descriptions of corresponding computer-implemented methods will also be provided in connection with FIG. 3. In addition, detailed descriptions of an illustrative computing system and network architecture capable of implementing one or more of the embodiments described herein will be provided in connection with FIGS. 5 and 6, respectively.

FIG. 1 is a block diagram of illustrative system 100 for analyzing emotional responses to online interactions. As illustrated in this figure, illustrative system 100 may include one or more modules 102 for performing one or more tasks. For example, and as will be explained in greater detail below, illustrative system 100 may include an identification module 104 that identifies an online interaction of a user. Illustrative system 100 may additionally include an analysis module 106 that detects an emotional response of the user to the online interaction by monitoring one or more emotional indicators of the user during the online interaction and determines, based on an evaluation of the one or more emotional indicators, that the emotional response of the user is outside an expected range. Illustrative system 100 may also include a security module 108 that performs a security action in response to determining that the user's emotional response is outside the expected range. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or online service 206), computing system 510 in FIG. 5, and/or portions of illustrative network architecture 600 in FIG. 6. One or more of modules 102 in FIG. 1 may also represent all or portions of one or more special-purpose computers configured to perform one or more tasks.

As illustrated in FIG. 1, system 100 may also include one or more databases, such as database 120. In one example, database 120 may be configured to store user information, online interaction information, emotional indicator measurements, and/or security policy information. Database 120 may represent portions of a single database or computing device or a plurality of databases or computing devices. For example, database 120 may represent a portion of online service 206 in FIG. 2, computing system 510 in FIG. 5, and/or portions of illustrative network architecture 600 in FIG. 6. Alternatively, database 120 in FIG. 1 may represent one or more physically separate devices capable of being accessed by a computing device, such as online service 206 in FIG. 2, computing system 510 in FIG. 5, and/or portions of illustrative network architecture 600 in FIG. 6.

Illustrative system 100 in FIG. 1 may be implemented in a variety of ways. For example, all or a portion of illustrative system 100 may represent portions of illustrative system 200 in FIG. 2. As shown in FIG. 2, system 200 may include a computing device 202 in communication with an online service 206 and a networked device 210 via a network 204. Computing device 202 may also be directly connected to a connected device 208. In one example, computing device 202 may be programmed with one or more of modules 102 and/or may store all or a portion of the data in database 120. Additionally or alternatively, online service 206 may be programmed with one or more of modules 102 and/or may store all or a portion of the data in database 120.

In one embodiment, one or more of modules 102 from FIG. 1 may, when executed by at least one processor of computing device 202 and/or online service 206, enable computing device 202 and/or online service 206 to analyze emotional responses to online interactions. For example, and as will be described in greater detail below, one or more of modules 102 may cause computing device 202 and/or online service 206 to analyze emotional responses to online interactions. As an initial step, identification module 104 may identify an online interaction 212 of a user. Analysis module 106 may then detect an emotional response 218 of the user to online interaction 212 by monitoring one or more emotional indicators 214 of the user during online interaction 212 and determining, based on an evaluation of the one or more emotional indicators 214, that emotional response 218 of the user is outside an expected range 216. Security module 108 may perform a security action 220 in response to determining that the user's emotional response 218 is outside expected range 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smartwatches, smart glasses, etc.), gaming consoles, combinations of one or more of the same, illustrative computing system 510 in FIG. 5, or any other suitable computing device.

Online service 206 generally represents any type or form of computing device that is capable of receiving, comparing, and storing data. Examples of online service 206 include, without limitation, application servers and database servers configured to provide various database services and/or run certain software applications.

Connected device 208 and networked device 210 generally represent any type or form of device that is capable of detecting, measuring, and/or reporting data associated with a user. Examples of connected device 208 and networked device 210 include, without limitation, video cameras, still image cameras, microphones, smartwatches, smart glasses, temperature sensors, pedometers, and accelerometers. Other examples of connected device 208 and networked device 210 may include security systems, embedded systems, and/or Internet of Things (IoT) devices. Examples of connected device 208 and networked device 210 may include computing devices similar to computing device 202 that may include various sensors and/or are capable of detecting, analyzing and/or reporting data associated with a user.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), illustrative network architecture 600 in FIG. 6, or the like. Network 204 may facilitate communication or data transfer using wireless or wired connections. In one embodiment, network 204 may facilitate communication between computing device 202 and online service 206.

FIG. 3 is a flow diagram of an illustrative computer-implemented method 300 for analyzing emotional responses to online interactions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of illustrative network architecture 600 in FIG. 6.

As illustrated in FIG. 3, at step 302, one or more of the systems described herein may identify an online interaction of a user. For example, identification module 104 may, as part of computing device 202 in FIG. 2, identify online interaction 212 of a user.

As used herein, the term "online interaction" generally refers any form of electronic communication received by a user. Online interactions may include, without limitation, text messages, still images, or video images received in the form of emails, SMS messages, MMS messages, instant messages, blog entries, social media content, voice mail messages, VOIP calls, or video chats.

Identification module 104 may identify online interactions in a variety of ways. For example, identification module 104 may use an application programming interface (API) of an email program to be notified when a user receives an email message. In another example, identification module 104 may use an API of a smartphone operating system to be notified when a user receives a text message, voice mail message, or video call on their mobile phone. In other examples, identification module 104 may monitor browser activity on a computing system to identify when a user is viewing social network content. In other examples, identification module 104 may communicate with agents executing on other devices to receive notification that the user has received an online interaction. For example, identification module 104 may receive notifications from an agent executing on a smartphone or in a social networking system that the user has received an online interaction. In other examples, identification module 104 may identify an online action of a user by reading from a database that stores information about online interactions of users.

At step 304, one or more of the systems described herein may detect an emotional response of the user to the online interaction by (1) monitoring one or more emotional indicators of the user during the online interaction and (2) determining, based on an evaluation of the one or more emotional indicators, that the emotional response of the user is outside an expected range. For example, analysis module 106 may, as part of computing device 202 in FIG. 2, detect emotional response 218 of the user to online interaction 212 by monitoring emotional indicator 214 of the user during online interaction 212 and determine, based on an evaluation of emotional indicator 214, that emotional response 218 of the user is outside expected range 216.

Analysis module 106 may monitor emotional indicators of the user during the online interaction in a variety of ways. For example, analysis module 106 may receive and analyze raw data from a variety of sensors or computing systems. Examples of raw data may include voice recordings from audio or video messages from the user, video or still images, and/or biometric data, such as heart rate, body temperature, perspiration measurements, blood oxygen levels, adrenaline levels, pupil dilation measurements, or eye tracking data. Other types of raw data analysis module 106 may receive include measurements of body movements, typing speed, or typographical error correction.

In other examples, analysis module 106 may receive processed data from smart sensors, computing devices, and/or online systems that collect and analyze raw data. Examples of processed data may include voice stress data based on analyses of audio or video messages, microexpression information from analyses of video or still images, stress level metrics from analyses of biometric data, and/or interaction data (such as the rate at which the user transmits online interactions, or the rate at which the user generates and/or corrects typographical errors) based on analyses of online interactions transmitted by the user. As used herein the term "microexpression" generally refers to a brief, involuntary facial expression a person exhibits that indicates his or her emotional state. Processed data may include data collected from several sources and analyzed to develop a more complete or accurate assessment of the subject's emotional state.

Analysis module 106 may determine, based on an evaluation of the emotional indicators, that the emotional response of the user is outside an expected range in a variety of ways. For example, analysis module 106 may establish an expected range for the user's emotional responses by monitoring one or more emotional indicators over a period of time to establish an expected range for the emotional indicators. Emotional indicators may vary widely from person to person but remain within a narrower range for each individual. For example, a normal resting heart rate may be 60 beats per minute for one person and 90 beats per minute for another. Heart rate monitoring may show that the resting heart rate for both individuals remains within a range of +/−20 percent under normal emotional circumstances, and that a variance of more than 20 percent from the mean indicates a strong emotional response. In some examples, the user may be asked to assess his or her emotional state during monitoring to establish an expected range for emotional indicators when not influenced by strong emotion. After monitoring one or more emotional indicators to determine an expected range for measurements of the emotional indicators for the user, analysis module 106 may determine that a subsequent measurement is outside the expected range, which may indicate that the user is experiencing a strong or unexpected emotional response.

In some examples, analysis module 106 may analyze measurements of emotional indicators for a group of users to establish an expected range for the emotional indicators. For example, analysis module 106 may analyze data collected from a group of people under controlled conditions indicating that a change in body temperature of more than 1° F. (0.6° C.) in less than 20 minutes is an indicator of a strong emotional response. Analysis module 106 may then determine that for a user a change in body temperature of more than 1° F. in that period of time indicates that the user is experiencing a strong emotional response.

In some examples, analysis module 106 may receive data indicating how measurements for one or more emotional indicators may suggest the nature of an emotional response. For example, analysis module 106 may determine that a combination of increased heart rate, restless movements detected by a security camera or accelerometers in a mobile phone, an increase in typing speed, and an increase in the number of typographical errors generated indicate that the user is experiencing fear or anger. Analysis module 106 may receive data indicating that a different set of emotional indicators suggest a strong positive emotional response, such as happiness or romantic feelings.

In one embodiment, analysis module 106 may (1) accumulate, for a group of users, emotional indicator measurements pertaining to an online interaction, (2) determine, based on an evaluation of the emotional indicator measurements, that the online interaction elicits emotional responses outside the expected range for the user and within the expected range for a subset of the group of users, and (3) perform the security action in response to the determination that the online interaction elicits emotional responses outside the expected range for the user and within the expected range for the subset of users.

Analysis module 106 may compare the emotional response of a user to that of a group in a variety of ways. For example, analysis module 106 may, as part of computing device 202 in FIG. 2, accumulate for a first user and an additional group of users, measurements of one or more emotional indicators 214 pertaining to online interaction 212. Analysis module 106 may determine that measurements for the emotional indicators 214 are within expected range 216 for the group of users, but outside expected range 216 for the first user. Based on the first user exhibiting an emotional response 218 to online interaction 212 that differs from that of the group of users, analysis module 106 may determine that online interaction 212 represents a source of strong emotional response for the first user. For example, the online interaction may be a message posted on a social network from someone cyberbullying a student displaying an anomalous emotional indicator. Other students in the classroom who are not experiencing cyberbullying may not exhibit the same emotional response. As will be described in greater detail below, a security action may be selected based on the determination that the first user is experiencing an emotional response that differs from that of others.

In one embodiment, analysis module 106 may (1) monitor emotional indicators of the user during the online interaction by accumulating, for a group of users, emotional indicator measurements pertaining to the online interaction, (2) determine, based on an evaluation of the emotional indicators, that the emotional response of the user is outside the expected range by determining, based on an evaluation of the emotional indicator measurements, that for at least a subset of the group of users the online interaction elicits emotional responses outside the expected range, and (3) the security action is performed in response to the determination that the online interaction elicits emotional responses outside the expected range for at least the subset of users. For example, analysis module 106 may accumulate, for a group of students in a school, measurements of one or more emotional indicators pertaining to an online interaction and determine that a subset of the group of students experience emotional responses outside an expected range.

Based on responses for the subset of students varying from the expected range, analysis module 106 may determine that the online interaction represents a common source of emotional response for the subset of students. For example, analysis module 106 may determine that for students from a school whose emotional indicators are monitored and accumulated, a group of students in one school classroom experienced emotional responses outside an expected range after receiving text messages from a student in the classroom. Additionally, analysis module 106 may determine that students in other classrooms did not experience emotional responses outside the expected range in response to online interactions with the same student. Based on the anomalous responses from the subset of students in the same classroom, analysis module 106 may determine that the student who sent the text messages represents a source of strong emotion for students in the classroom, and that further investigation is warranted to determine the nature and cause of the emotional responses.

FIG. 4 is a block diagram of an illustrative computing system 400 for analyzing emotional responses to online interactions. FIG. 4 includes components of illustrative computing system 200 in FIG. 2, such as computing device 202, network 204, and online service 206. As in illustrative computing system 200, computing device 202 may be in direct communication with one or more connected devices 208. Illustrative computing system 400 may also include a server 402 in communication with computing device 202, online service 206, and networked device 210. Server 402 generally represents any type or form of computing device that is capable of receiving, comparing, and storing data. Examples of server 402 include, without limitation, application servers and database servers configured to provide various database services and/or run certain software applications.

As shown in FIG. 4, computing device 202 may include identification module 104, which identifies online interactions 212. Server 402 may represent a backend service that accumulates and analyzes users' emotional responses. Server 402 may include database 120, which may be configured to accumulate and store user information, online interaction information, emotional indicator measurements, and/or security policy information. Server 402 may receive information about online interaction 212 from identification module 104, which may be a security agent executing on computing device 202. Analysis module 106, executing on server 402, may analyze online interaction 212 and emotional indicator 214 information to determine whether emotional response 218 is outside an expected range 216. Security module 108, executing on server 402, may execute one or more security actions 220 in response to determining that an emotional response 218 for a user is outside an expected range 216.

Returning to FIG. 3, at step 306, one or more of the systems described herein may perform a security action in response to determining that the user's emotional response is outside the expected range. For example, security module 108 may, as part of computing device 202 in FIG. 2, perform security action 220 in response to determining that the user's emotional response 218 is outside expected range 216.

Security module 108 may perform a variety of security actions 220. For example, security module 108 may block one or more messages from a sender that analysis module 106 has determined to elicit strong emotions for a user. Additionally or alternatively, security module 108 may block one or more messages from a social network that represents a source of online interactions that elicit strong emotional responses in a user. In another example, security module 108 may report an online interaction that elicits a strong emotional response in a user to an administrator of the online service. Security module 108 may, for example, recommend that the online service suspend the account of a user engaged in cyberbullying. In another example, security module 108 may report the online interaction to a parent or school administrator of the user. If the user's emotional responses are being monitored by an employer, for example, security module 108 may report the online interaction to an account administrator for the user.

In other examples, security module may initiate monitoring of additional emotional indicators for the user, for example, to determine the nature of the emotional response or to determine whether additional security actions are needed. For example, after notifying a parent of a potential cyberbullying situation, security module 108 may initiate more intensive monitoring of emotional indicators for the child and determine whether it may be necessary to block access to a social network until a parent has time to receive and respond to a notification. In some examples, security module 108 may suggest that a parent provide a child with an additional monitoring device, such as a smartwatch, to provide additional emotional indicator data.

Security module 108 may also initiate positive security actions in response to determining that the user's emotional response is outside an expected range in a positive manner. For example, security module 108 may report to a parent on a child's interests, successes, friendships, or romantic relationships.

In some embodiments, one or more of the systems described herein may (1) identify a set of online interactions between the user and a second user, (2) monitor one or more emotional indicators of the user during the set of online interactions, (3) evaluate the emotional indicators to assign a category to an emotional relationship between the user and the second user, and (4) perform a security action based on the category assigned to the emotional relationship between the user and the second user. For example, identification module 104 may, as part of computing device 202 in FIG. 2, identify a set of online interactions between the user and a second user. Analysis module 106 may monitor one or more emotional indicators of the user during the set of online interactions and evaluate the emotional indicators to assign a category to an emotional relationship between the user and the second user. Security module 108 may perform a security action based on the category assigned to the emotional relationship between the user and the second user.

The systems described herein may perform the above-described actions in a variety of ways. For example, identification module 104 may maintain a database of online interactions between users. To limit the size and complexity of the online interaction data, identification module 104 may limit the stored data to online interactions that elicited a strong emotional response or to online interactions between frequent associates. In another example, identification module 104 may store the date and time online interactions occurred and the nature of the online interactions (whether an online interaction was in the form of a voice mail, social network message, etc.). Analysis module 106 may also store emotional indicator data associated with the online interactions. Analysis module 106 may then evaluate the stored online interaction and emotional response data to identify significant relationships between users and categorize their emotional relationships. For example, analysis module 106 may identify a large number online interactions between two users and positive emotional indicators associated with the online interactions and then categorize the relationship between the two users as a friendship.

Analysis module 106 may assign a variety of relationship categories in a variety of ways. For example, analysis module 106 may evaluate the frequency and intensity of online interaction and emotional indicator data between two users to categorize a relationship as friendly or unfriendly. Additionally or alternatively, analysis module 106 may evaluate both the frequency and content of online interactions to determine if two users may be categorized as friends (with frequent online interactions that sometimes deal with personal issues and positive emotional indicators) or acquaintances (with less frequent online interactions that rarely deal with personal issues and emotional indicators that mostly range from positive to indifferent). In a professional setting, analysis module 106 may similarly categorize relationships as friendly, unfriendly, or collegial.

In other examples, analysis module 106 may evaluate online interaction and emotional response data between several users to identify and categorize group relationships. For example, analysis module 106 may evaluate the frequency and intensity of online interaction and emotional indicator data to identify a group of mutual friends. Analysis module 106 may further categorize a relationship between two members of a group of mutual friends as "best friends." In another example, analysis module 106 may categorize a group of mutual friends for which online interactions with people outside the group elicit negative emotional responses as an exclusive group, such as a clique or a gang.

Once analysis module 106 has identified and categorized relationships between users, security module 108 may perform security actions based on the assigned relationship categories. For example, security module 108 may provide parents with a list of their child's friends and identify their best friend. In another example, security module 108 may provide a teacher with a list of students who have formed a clique that excludes other students outside the group.

As additional online interaction and emotional indicator is collected, analysis module 106 may identify changes in relationships. For example, analysis module 106 may identify negative emotional indicators associated with online interactions between two children previously categorized as friends. Security module 108 may then notify the parents of the children that problems may have developed in their children's friendship. Security module 108 may also filter or block interactions between the children until parents are available to intercede. In another example, analysis module 106 may identify negative emotional indicators associated with online interactions between a child previously identified as a member of a clique and other members of the clique. Security module 108 may then notify a teacher or school administrator of a potential cyberbullying situation developing for the excluded clique member.

As described in greater detail above, the systems and methods described herein may analyze emotional responses to online interactions by identifying online interactions for a user, monitoring emotional indicators associated with the online interactions, and determining whether the emotional indicators indicate an emotional response that is outside an expected range. In response to detecting a strong emotional response to an online interaction, the systems and methods described herein may initiate a security action. By taking action when online interactions elicit strong emotional responses, the systems and methods described herein may help create a safe online environment for users and/or improve the quality of users' participation in online services.

Figure 5:
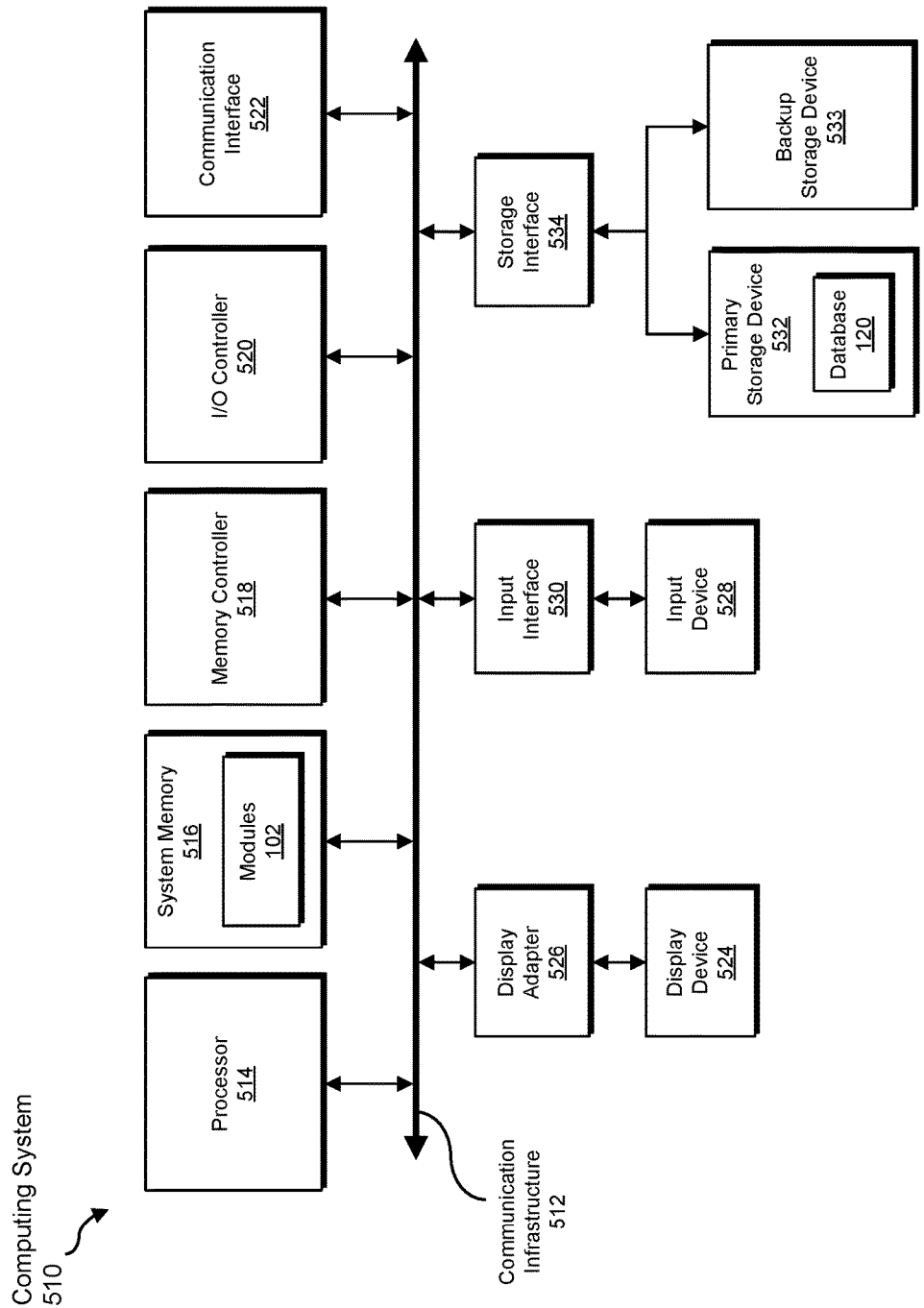
FIG. 5 is a block diagram of an illustrative computing system capable of implementing one or more of the embodiments described and/or illustrated herein.

FIG. 5 is a block diagram of an illustrative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the illustrative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, illustrative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between illustrative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, illustrative computing system 510 may also include at least one input device 528 coupled to communication infrastructure 512 via an input interface 530. Input device 528 generally represents any type or form of input device capable of providing input, either computer or human generated, to illustrative computing system 510. Examples of input device 528 include, without limitation, a keyboard, a pointing device, a speech recognition device, or any other input device.

As illustrated in FIG. 5, illustrative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the illustrative embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the illustrative embodiments described and/or illustrated herein. Additionally or alternatively, one or more of the illustrative embodiments described and/or illustrated herein may be implemented in firmware and/or hardware. For example, computing system 510 may be configured as an Application Specific Integrated Circuit (ASIC) adapted to implement one or more of the illustrative embodiments disclosed herein.

Figure 6:
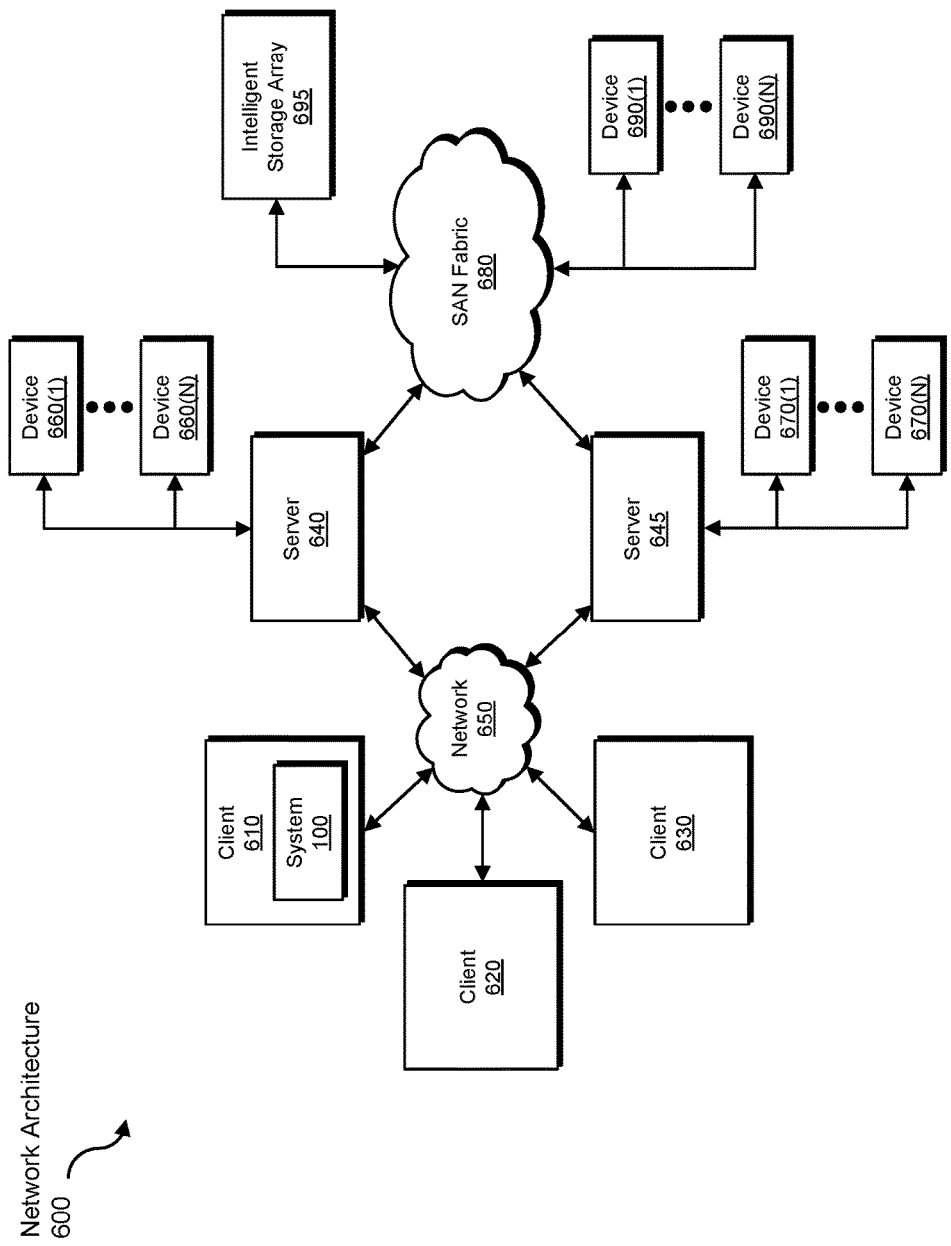
FIG. 6 is a block diagram of an illustrative computing network capable of implementing one or more of the embodiments described and/or illustrated herein.

FIG. 6 is a block diagram of an illustrative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as illustrative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to illustrative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the illustrative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the illustrative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an illustrative method for analyzing emotional responses to online interactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered illustrative in nature since many other architectures can be implemented to achieve the same functionality.

In some examples, all or a portion of illustrative system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of illustrative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of illustrative system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of illustrative system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of illustrative system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of illustrative system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of illustrative system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various illustrative methods described and/or illustrated herein may also omit one or more of the steps described or illustrated herein or include additional steps in addition to those disclosed.

While various embodiments have been described and/or illustrated herein in the context of fully functional computing systems, one or more of these illustrative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the illustrative embodiments disclosed herein.

In addition, one or more of the modules described herein may transform data, physical devices, and/or representations of physical devices from one form to another. For example, one or more of the modules recited herein may receive online interaction and emotional indicator data to be transformed, transform the online interaction and emotional indicator data, output a result of the transformation to determine an expected range for the emotional indicator data, use the result of the transformation to determine that an emotional response to one or more online interactions is outside an expected range, and store the result of the transformation to initiate a security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the illustrative embodiments disclosed herein. This illustrative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for analyzing emotional responses to online interactions, at least a portion of the method being performed by a computing device comprising at least one processor, the method comprising:
identifying an online interaction between a user and a second user, the online interaction comprising an electronic message received by the user;
detecting an emotional response of the user to the online interaction by:
monitoring one or more emotional indicators of the user during the online interaction; and
determining, based on an evaluation of the one or more emotional indicators, that the emotional response of the user to the online interaction:
comprises a negative emotional response of the user to the online interaction; and
is outside an expected range;
evaluating the one or more emotional indicators to assign a category to an emotional relationship between the user and the second user; and
performing a security action to protect the user based on the category assigned to the emotional relationship between the user and the second user and in response to determining that the emotional response of the user to the online interaction:
comprises a negative emotional response of the user to the online interaction; and
is outside the expected range;
wherein the emotional response of the user to the online interaction further comprises a change in a measurement of at least one emotional indicator of the user that occurs in response to the online interaction.

2. The computer-implemented method of claim 1, wherein determining that the emotional response of the user is outside the expected range comprises:
identifying previous measurements for the one or more emotional indicators of the user to determine the expected range of the one or more emotional indicators for the user; and determining that the emotional response of the user is outside the expected range for the user.

3. The computer-implemented method of claim 1, further comprising:
analyzing measurements of the one or more emotional indicators for a group of users to establish the expected range.

4. The computer-implemented method of claim 1, wherein:
monitoring the one or more emotional indicators of the user during the online interaction comprises accumulating, for a plurality of users, emotional indicator measurements pertaining to the online interaction;
determining, based on the evaluation of the one or more emotional indicators, that the emotional response of the user is outside the expected range comprises determining, based on the evaluation of the emotional indicator measurements, that for at least a subset of the plurality of users the online interaction elicits emotional responses outside the expected range; and
the security action is performed in response to the determination that the online interaction elicits emotional responses outside the expected range for at least the subset of the plurality of users.

5. The computer-implemented method of claim 1, wherein:
the method further comprises:
accumulating, for a plurality of users, emotional indicator measurements pertaining to the online interaction; and
determining, based on the evaluation of the emotional indicator measurements, that the online interaction elicits emotional responses outside the expected range for the user and within the expected range for a subset of the plurality of users; and
the security action is performed in response to the determination that the online interaction elicits emotional responses outside the expected range for the user and within the expected range for the subset of the plurality of users.

6. The computer-implemented method of claim 1, wherein:
the method further comprises:
identifying a plurality of online interactions between the user and the second user;
monitoring one or more emotional indicators of the user during the plurality of online interactions; and
evaluating the one or more emotional indicators to assign the category to the emotional relationship between the user and the second user comprises evaluating the one or more emotional indicators of the user during the plurality of online interactions.

7. The computer-implemented method of claim 1, wherein the electronic message comprises at least one of:
an email message;
a text message;
social network content;
an audio message; and
a video message.

8. The computer-implemented method of claim 1, wherein the security action comprises at least one of:
blocking a message from a sender;
blocking a social network message;
reporting the online interaction to an administrator of an online service;
reporting the online interaction to a parent of the user;
reporting the online interaction to an account administrator for the user; and
reporting the online interaction to a school administrator for the user.

9. A system for analyzing emotional responses to online interactions, the system comprising:
an identification module, stored in memory, that identifies an online interaction of a user, the online interaction comprising an electronic message received by the user;
an analysis module, stored in memory, that:
detects an emotional response of the user to the online interaction by:
monitoring one or more emotional indicators of the user during the online interaction; and
determining, based on an evaluation of the one or more emotional indicators, that the emotional response of the user to the online interaction:
comprises a negative emotional response of the user to the online interaction; and
is outside an expected range; and
evaluates the one or more emotional indicators to assign a category to an emotional relationship between the user and the second user;
a security module, stored in memory, that performs a security action to protect the user based on the category assigned to the emotional relationship between the user and the second user and in response to determining that the emotional response of the user to the online interaction:
comprises a negative emotional response of the user to the online interaction; and
is outside the expected range; and
at least one physical processor configured to execute the identification module, the analysis module, and the security module;
wherein the emotional response of the user to the online interaction further comprises a change in a measurement of at least one emotional indicator of the user that occurs in response to the online interaction.

10. The system of claim 9, wherein the analysis module determines that the emotional response of the user is outside the expected range by:
identifying previous measurements for the one or more emotional indicators of the user to determine the expected range of the one or more emotional indicators for the user; and
determining that the emotional response of the user is outside the expected range for the user.

11. The system of claim 9, wherein the analysis module analyzes measurements of the one or more emotional indicators for a group of users to establish the expected range.

12. The system of claim 9, wherein:
the analysis module:
monitors the one or more emotional indicators of the user during the online interaction by accumulating, for a plurality of users, emotional indicator measurements pertaining to the online interaction; and
determines, based on the evaluation of the one or more emotional indicators, that the emotional response of the user is outside the expected range by determining, based on the evaluation of the emotional indicator measurements, that for at least a subset of the plurality of users the online interaction elicits emotional responses outside the expected range; and the security module performs the security action in response to the determination that the online interaction elicits emotional responses outside the expected range for at least the subset of the plurality of users.

13. The system of claim 9, wherein:
the analysis module:
  accumulates, for a plurality of users, emotional indicator measurements pertaining to the online interaction; and
  determines, based on the evaluation of the emotional indicator measurements, that the online interaction elicits emotional responses outside the expected range for the user and within the expected range for a subset of the plurality of users; and
the security module performs the security action in response to the determination that the online interaction elicits emotional responses outside the expected range for the user and within the expected range for the subset of the plurality of users.

14. The system of claim 9, wherein:
the identification module identifies a plurality of online interactions between the user and the second user;
the analysis module:
  monitors one or more emotional indicators of the user during the plurality of online interactions; and
  evaluates the one or more emotional indicators to assign the category to the emotional relationship between the user and the second user by evaluating the one or more emotional indicators of the user during the plurality of online interactions.

15. The system of claim 9, wherein the electronic message comprises at least one of:
an email message;
a text message;
social network content;
an audio message; and
a video message.

16. A non-transitory computer-readable medium comprising one or more computer-readable instructions that, when executed by at least one processor of a computing device, cause the computing device to:
identify an online interaction between a user and a second user, the online interaction comprising an electronic message received by the user;
detect an emotional response of the user to the online interaction by:
  monitoring one or more emotional indicators of the user during the online interaction; and
  determining, based on an evaluation of the one or more emotional indicators, that the emotional response of the user to the online interaction:
    comprises a negative emotional response of the user to the online interaction; and
    is outside an expected range;
evaluate the one or more emotional indicators to assign a category to an emotional relationship between the user and the second user; and
perform a security action to protect the user based on the category assigned to the emotional relationship between the user and the second user and in response to determining that the emotional response of the user to the online interaction:
  comprises a negative emotional response of the user to the online interaction; and
  is outside the expected range;
    wherein the emotional response of the user to the online interaction further comprises a change in a measurement of at least one emotional indicator of the user that occurs in response to the online interaction.

17. The non-transitory computer-readable medium of claim 16, wherein the one or more computer-readable instructions cause the computing device to determine that the emotional response of the user is outside the expected range by:
identifying previous measurements for the one or more emotional indicators of the user to determine the expected range of the one or more emotional indicators for the user; and
determining that the emotional response of the user is outside the expected range for the user.

18. The non-transitory computer-readable medium of claim 16, wherein the one or more computer-readable instructions cause the computing device to analyze measurements of the one or more emotional indicators for a group of users to establish the expected range.

19. The non-transitory computer-readable medium of claim 16, wherein the one or more computer-readable instructions cause the computing device to:
monitor the one or more emotional indicators of the user during the online interaction by accumulating, for a plurality of users, emotional indicator measurements pertaining to the online interaction;
determine, based on the evaluation of the one or more emotional indicators, that the emotional response of the user is outside the expected range by determining, based on the evaluation of the emotional indicator measurements, that for at least a subset of the plurality of users the online interaction elicits emotional responses outside the expected range; and
perform the security action in response to the determination that the online interaction elicits emotional responses outside the expected range for at least the subset of the plurality of users.

20. The method of claim 1, wherein the security action comprises monitoring additional emotional indicators for the user.

* * * * *